US 6,574,531 B2

(12) United States Patent
Tan et al.

(10) Patent No.: US 6,574,531 B2
(45) Date of Patent: Jun. 3, 2003

(54) METHOD AND APPARATUS FOR PROVIDING INFORMATION TO AN OCCUPANT OF A VEHICLE

(75) Inventors: Adrian Ken-min Tan, Farmington, MI (US); Colleen Serafin, Ann Arbor, MI (US); John Thomas Kosinski, II, River Rouge, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/915,124

(22) Filed: Jul. 25, 2001

(65) Prior Publication Data

US 2003/0023350 A1 Jan. 30, 2003

(Under 37 CFR 1.47)

(51) Int. Cl.⁷ .............................. G06F 17/00; B60Q 1/00
(52) U.S. Cl. ........................ 701/1; 701/211; 340/825.5; 345/204
(58) Field of Search ............................. 701/1, 200, 210, 701/211; 340/990, 995, 825.49, 825.5; 345/717, 718, 204, 5

(56) References Cited

U.S. PATENT DOCUMENTS

| 5,121,112 A | * | 6/1992 | Nakadozono ............... 307/10.1 |
| 5,732,368 A | | 3/1998 | Knoll et al. ................... 701/1 |
| 5,757,359 A | | 5/1998 | Morimoto et al. .......... 345/156 |
| 5,764,139 A | * | 6/1998 | Nojima et al. ............... 340/438 |
| 5,949,345 A | | 9/1999 | Beckert et al. ........ 340/815.41 |
| 6,029,110 A | | 2/2000 | Zuber et al. ................. 701/200 |
| 6,157,297 A | * | 12/2000 | Nakai .......................... 340/461 |
| 6,181,996 B1 | * | 1/2001 | Chou et al. .................. 340/439 |
| 6,256,558 B1 | * | 7/2001 | Sugiura et al. ............. 340/529 |
| 6,266,589 B1 | * | 7/2001 | Boies et al. .................... 701/1 |
| 6,415,224 B1 | * | 7/2002 | Wako et al. ................. 701/208 |

FOREIGN PATENT DOCUMENTS

| DE | 197 15 325 A1 | 10/1998 |
| EP | 0 672 892 A1 | 4/1995 |

OTHER PUBLICATIONS

Derwent English Abstract for German Application 197 15 325 A1.

* cited by examiner

Primary Examiner—Tan Q. Nguyen
(74) Attorney, Agent, or Firm—Brinks Hofer Gilson & Lione

(57) ABSTRACT

A vehicle computer system and method of providing information to an occupant of a vehicle that minimizes complete feature lock out are provided. The operating system of the computer is adapted to selectively display full and limited functionality versions of a particular screen, preferably based on whether the vehicle is in motion. A text-to-speech engine can automatically generate audio based on a particular screen once motion is detected. The availability of a limited functionality version of the screen and audio, either independently or together, allow a vehicle occupant to retrieve information from the computer system without distraction.

22 Claims, 2 Drawing Sheets

METHOD AND APPARATUS FOR PROVIDING INFORMATION TO AN OCCUPANT OF A VEHICLE

FIELD OF THE INVENTION

The present invention relates to methods and apparatuses for providing various types of information to one or more occupants of a motor vehicle.

BACKGROUND OF THE INVENTION

Vehicle computer systems frequently contain an output for displaying information to an occupant of the vehicle. Also, these systems typically allow for interaction, via an input, with the occupant that affects the information displayed on the output. For example, by pressing one or more input keys, an occupant may navigate through a menu structure in a navigation program in order to display a desired map on an output screen.

To prevent a driver of a vehicle from interacting with these computer systems while the vehicle is in motion, a "lock out" feature can be employed. Typically, these features disable the entire computer system, thereby preventing all interaction by the driver while the vehicle is in motion. This complete disabling of the system is undesirable, however, because it bars access to all information, even that which requires only a minimal level of interaction by the driver.

Initial attempts at providing a limited level of access to information while driving have been made. For example, U.S. Pat. No. 5,949,345 to Beckert, et al., for DISPLAYING COMPUTER INFORMATION TO A DRIVER OF A VEHICLE describes a vehicle computer system that allows applications to distinguish between driving and non-driving related information, and subsequently allows the display of only driving related information while the vehicle is in motion. Unfortunately, the system completely locks out all functions not related to driving, such as displaying entertainment related media and information.

SUMMARY OF THE INVENTION

The present invention provides a vehicle computer system that communicates information of various types to an occupant of the vehicle even while the vehicle is in motion. The system allows a computer application to designate alternate versions of screens, or views of particular information items, for displaying on an output. The system selectively displays one of the versions during vehicle movement and the other version while the vehicle is at rest. For a particular screen, one version is preferably a full functionality version, which contains all information (e.g., full text of an Internet news story) or available actions (e.g., a fully active menu) associated with the screen, while a second version is preferably a limited functionality version containing only a summary of the information (e.g., a portion of the title of an Internet news story) or a limited number of available actions (e.g., a menu with disabled options). The limited functionality version of the screen allows for quick retrieval of visual information related to the information contained in the full functionality version of the screen without distracting the driver.

The vehicle computer system may also include a text to speech engine adapted to generate audio related to information displayed on the output of the device. A preferred embodiment of the invention displays a limited functionality version of a particular screen and automatically begins generating audio through the text to speech engine based on the text of the full functionality version of the screen while the vehicle is in motion.

The present invention also provides a method of providing information to an occupant of a vehicle. In a preferred embodiment, the method comprises providing a vehicle computer system in accordance with the present invention, receiving input from an occupant, determining whether the vehicle is in motion, displaying an appropriate screen on the output, and automatically generating audio through the text to speech engine based on the current screen if the vehicle is in motion.

DETAILED DESCRIPTION OF THE INVENTION

The following description of preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
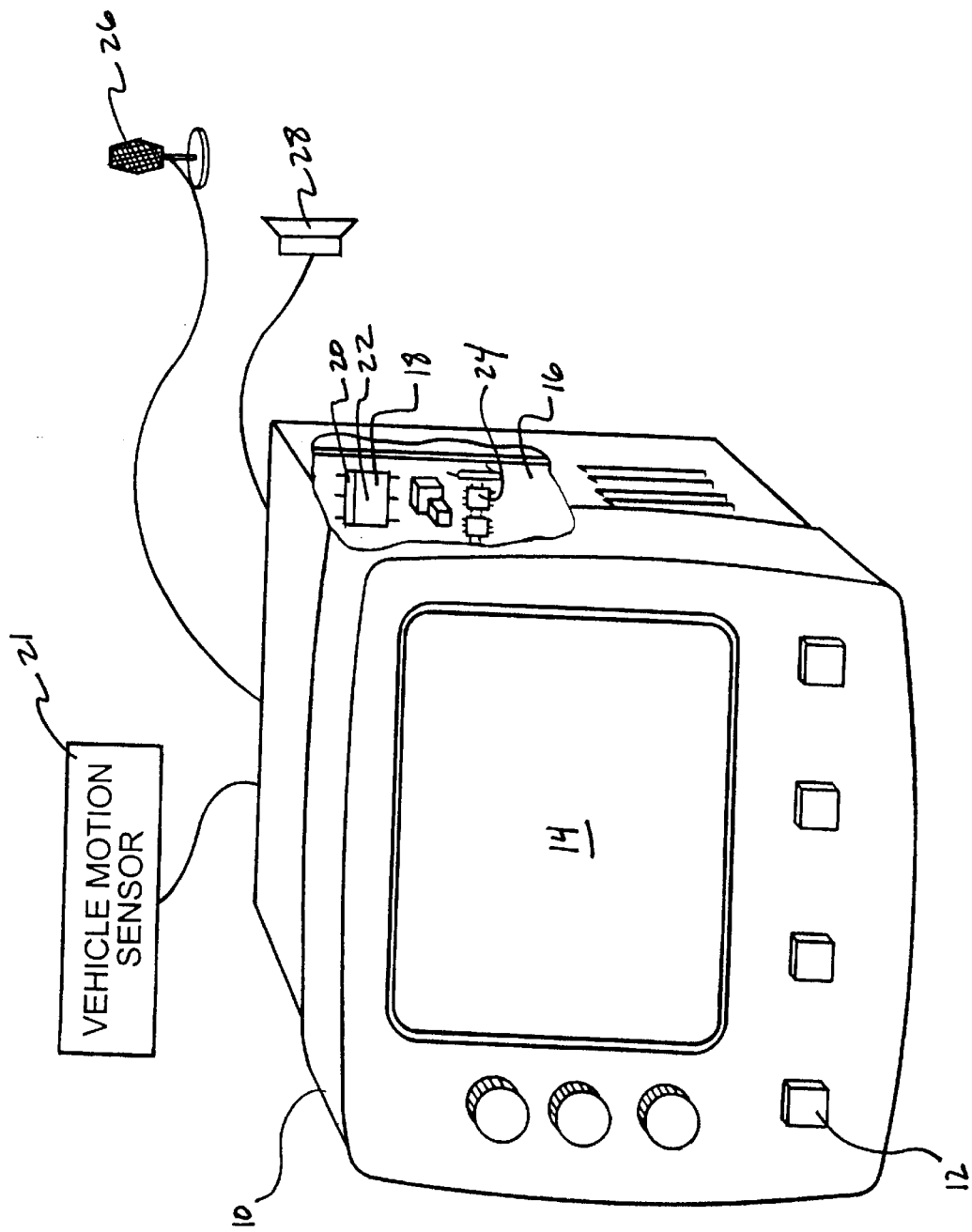
FIG. 1 is a perspective view of a vehicle computer system incorporating a preferred embodiment of the present invention.

FIG. 1 illustrates a vehicle computer system 10 that incorporates a preferred embodiment of the present invention. The vehicle computer system 10 can be any device capable of receiving input from an occupant of the vehicle and displaying or otherwise outputting information. Examples of vehicle computer systems suitable for use with the present invention include radios, integrated mobile phones, and integrated personal computers. The present invention is particularly well-suited for incorporation into navigational computers that allow an occupant of the vehicle to input an address or location to be mapped and displayed by the computer. Also, the present invention is particularly well-suited for incorporation into systems that interact with external computer networks, such as the Internet, to retrieve information of interest to an occupant of the vehicle, such as news stories and/or electronic mail. Other examples of vehicle computer systems include televisions, video display terminals, and entertainment systems.

The vehicle computer system 10 includes input means that allow an occupant of the vehicle to input information into the system 10. As illustrated in the figure, typical systems include various buttons 12 that allow an occupant of the vehicle to input information, such as a destination address or location, or to select a particular function of the system 10. Other suitable forms of input means include dials, switches, keyboards, and joysticks.

The system 10 also includes output means adapted to display information to an occupant of the vehicle. A suitable example of output means for use in the present invention is a display screen 14. The display screen 14 is preferably an LCD screen, but may comprise any suitable type of display that is capable of projecting information to one or more occupants of the vehicle.

Preferably, the input and output means of the system 10 comprise structurally distinct devices, i.e., the system 10 preferably includes an input device and a separate output device. Alternatively, the input and output means may be combined into a single device or component. For example, the system may include a touch sensitive display screen that allows the output portion of the device to also serve as an input device. Of course, a combination of these alternatives can also be employed.

The vehicle computer system 10 includes electronics 16 appropriate for the type of system. For example, a navigational computer typically includes hardware suitable for reading stored data, such as CD ROMS, as well as electronics for resolving the position of the vehicle relative to the earth, such as GPS receivers, etc. The electronics may also include modems, network interfaces, or other communicative means that allow the system 10 to interact with and retrieve information from external networks, such as the Internet.

The electronics 16 include a computer processor 18 that is capable of executing various types of software programs. Essentially any suitable computer processor can be incorporated into the system 10 of the present invention. In any given embodiment, the processor chosen will depend on the computing needs, e.g., power and speed, of the overall system. Also, the electronics 16 preferably include one or more application programs 20. The application programs 20 preferably comprise software built into the electronics 16 of the system 10. Alternatively, the application programs 20 may be supplied to the system 10 via some type of temporary or removable memory, such as floppy disks, CD ROMs, smart memory cards, PCMCIA cards, or hard drives.

Electronics 16 also preferably include an operating system 22 adapted to interact with the application programs 20. The interaction between the operating system 22 and application programs 20 includes common computer functions between an operating system and a software application, such as launching application programs, controlling the visual interface of the application program, and exiting the application program.

Preferably, electronics 16 also include a text to speech engine 24. The text to speech engine 24 preferably comprises a computer program capable of translating textual information to audio information. Preferably, the text to speech engine 24 is adapted to translate textual information into a language, such as English, understandable to an occupant of the vehicle. Also preferable, the text to speech engine 24 is adapted to receive audio input from an occupant of the vehicle and to translate such input into data that can be acted upon by an application program 20 or the operating system 22.

To facilitate interaction between an occupant of the vehicle and the text to speech engine 24, the vehicle computer system 10 preferably includes a microphone 26 and one or more speakers 28. The microphone 26 is preferably positioned within the vehicle cockpit such that it is able to receive verbal commands from an occupant situated within the cockpit. Likewise, the speakers 28 are preferably positioned within the vehicle cockpit such that they are able to convey audio information to an occupant situated within the cockpit.

The application programs 20 preferably provide alternate versions of various screens, or collections of visual information. The alternate versions of the screens provide two visually distinct representations of information associated with a particular file.

The system 10 also preferably includes one or more sensors 21 capable of determining whether the vehicle is in motion. The sensors 21 are preferably associated with the axles, wheels, speedometer, parking brake or any other component of the vehicle that indicates vehicle motion or lack thereof.

Figure 2:
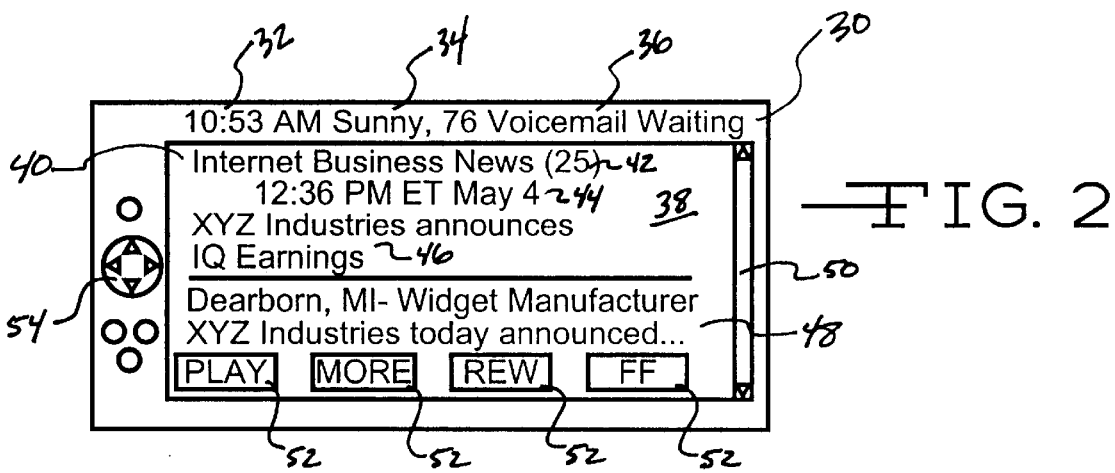
FIG. 2 is a schematic view of a full functionality version of an Internet news screen in accordance with the present invention.

In a preferred embodiment, one application program 20 comprises an Internet news retrieval program. For one or more news articles, the program provides two alternate versions of a screen associated with an article. FIG. 2 illustrates the first version, or full functionality version 30, of the screen. As shown in the figure, the full functionality version 30 displays complete information for common features of the system, such as the clock 32, weather summary 34, and voice mail indicator 36. Also, in the content window 38, the full functionality version 30 displays the complete contents of the news article. Preferably, the full functionality version 30 displays at least the following information: a news category 40, total number of articles in the category 42, dateline of the story 44, full title of the story 46, full text of the story 48, active scroll bar 50 for navigating through the story, active touch buttons 52 for triggering system functions, and an active directional navigator 54.

The full functionality version 30 preferably allows access to all features and functions of the system 10, operating system 22, and application programs 20. Thus, in the example shown in the figure, the occupant of the vehicle can read the entire text of the news story associated with the screen by scrolling through the text 48, when the operating system 20 displays the full functionality version 30.

Figure 3:
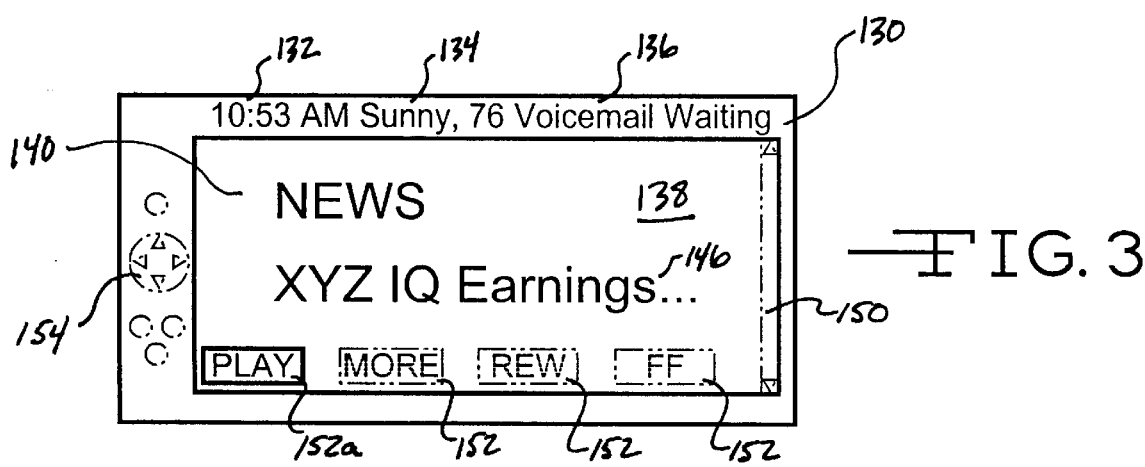
FIG. 3 is a schematic of a limited functionality version of an Internet news screen in accordance with the present invention.

FIG. 3 illustrates an alternate version, a limited functionality version 130, of the screen illustrated in FIG. 2. Like reference numbers in FIG. 3 refer to similar features illustrated in FIG. 2.

As shown in the figure, the limited functionality version 130 displays the system functions, such as the clock 132, the weather summary 134, and the voice mail indicator 136. These features are characterized by small pieces of visual information, such as digits, words or icons, that allow for quick retrieval of information. As such, these types of features are preferably included in both the full 30 and limited 130 functionality versions of the screen.

The content window 138 of the limited functionality version 130 preferably contains abbreviated or truncated versions of some of the information presented in the full functionality version. For example, the figure illustrates a limited functionality version 130 that only includes a brief category name 140 and a brief title 146. Preferably, these items are displayed in a larger font, allowing for quick retrieval of the information displayed on the screen. As shown in the figure, the interactive features of the screen are preferable inactivated, such as the scroll bar 150, touch button 152, and directional navigator 154. One or more touch button 152a may remain active to allow the triggering of a feature that requires minimal interaction with the system, such as the text-to-speech engine.

Figure 4:
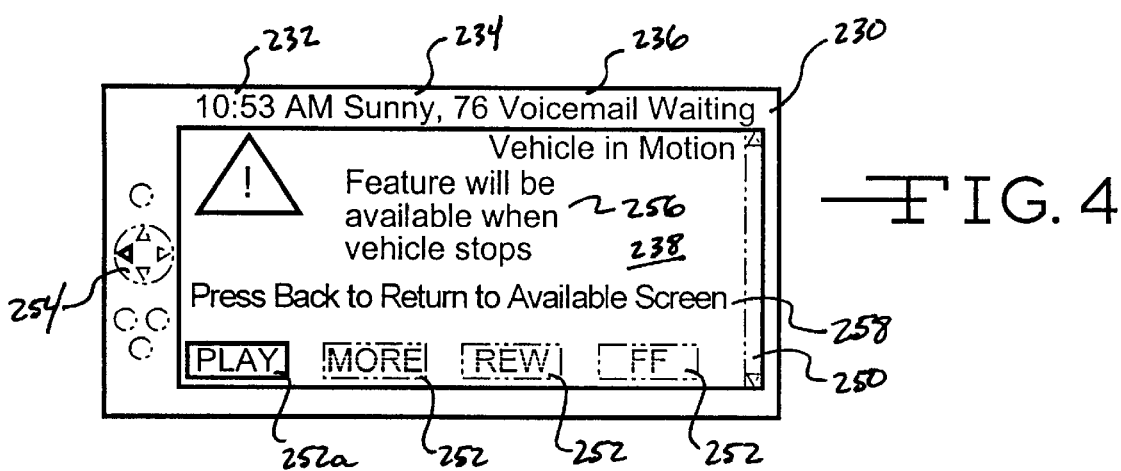
FIG. 4 is a schematic of a common screen in accordance with the present invention.

The system also preferably includes a common screen for displaying on the output when a limited functionality version of the screen is not available. The common screen is preferably independent of the application programs, and it is particularly preferred that the operating system provide the common screen. FIG. 4 illustrates a suitable common screen 230. Again, like reference numbers in FIG. 4 refer to similar features shown in the other figures. The common screen 230 preferably provides notice 256 to an occupant of the vehicle that they have reached a point at which a limited functionality version of the screen is not available. Also preferably, the common screen includes a notice 258 as to how to return to the last available limited functionality version in the hierarchy of the menu or program structure.

The present invention also provides a method of providing information to an occupant of a vehicle. Preferably, the method comprises providing a vehicle computer system in accordance with the present invention, receiving information from an input of the system (e.g., the activation of a particular button), and selectively displaying the full and limited functionality version of a particular screen on the output of the system.

Preferably, the operating system selectively chooses which version of the screen to display based on whether the vehicle is in motion. The operating system can receive data related to vehicle motion from a motion sensor placed appropriately in the vehicle, as described above. Based on this data, the operating system preferably chooses between the two alternate versions of the screen. In the preferred method, the operating system displays the full functionality version of the screen if the vehicle is not in motion, giving an occupant of the vehicle access to all information associated with the screen. However, if the vehicle is in motion, the operating system displays the limited functionality version of the screen. This method restricts the ability of a vehicle occupant to interact with the computer system, but avoids complete lock-out of features. Of course, the application and/or computer processor can select the appropriate screen based on vehicle motion, if appropriate.

It is preferred that the sensor continually monitor for motion of the vehicle. This continuous monitoring allows the operating system to switch from the full functionality version of the screen to the limited functionality version as soon as vehicle motion is detected. Alternatively, the sensor can monitor the motion of the vehicle at a regular or intermittent interval.

Also preferably, the operating system automatically initiates the generation of audio, through the text-to-speech engine, based on the information associated with the screen currently being displayed as soon as the sensor detects motion of the vehicle. This allows an occupant of the vehicle to view the limited functionality version of the screen to gain a summary of the information, and to listen to audio based on the complete information associated with the screen. As indicated above, it is preferred that this generation of audio be initiated automatically upon detection of vehicle motion. Alternatively, an occupant of the vehicle can manually initiate generation of audio by activating an appropriate function key on the input while the limited functionality version of the screen is displayed on the output (see, for example, FIG. 3).

Also preferable, the method includes displaying a common screen whenever the operating system chooses to display a limited functionality version but the application program does not provide such a version of the appropriate screen. Preferably, the common screen is provided by the operating system itself and includes a notice to the effect that a limited functionality version is not available.

The foregoing disclosure is the best mode devised by the inventors for practicing the invention. It is apparent, however, that several variations in the method and apparatus in accordance with the present invention may be conceivable to one skilled in the art. Inasmuch as the foregoing disclosure is intended to enable one skilled in the pertinent art to practice the instant invention, it should not be construed to be limited thereby, but should be construed to include such aforementioned variations. As such, the present invention should be limited only by the spirit and scope of the appended claims.

We claim:

1. A method of providing information to an occupant of a vehicle, comprising:

providing a vehicle computer system including a processor, an input, an output, one or more applications adapted to provide screens for display on the output, at least one of the screens having a full functionality version and a limited functionality version, and an operating system adapted to execute the application and selectively allow the display of the full functionality and limited functionality versions of the screen on the output;

receiving information from the input;

selectively displaying the full functionality and limited functionality versions of the screen on the output; and broadcasting an audio communication to the vehicle occupant based on the information included on the selected version of the screen.

2. The method in accordance with claim 1, further comprising providing a common screen and displaying the common screen on the output if there is no limited functionality version of the screen associated with the information received from the input.

3. The method in accordance with claim 1, further comprising determining whether said vehicle is in motion and wherein selectively displaying the full functionality and limited functionality versions of the screen comprises displaying the full functionality version of the screen associated with the information received from the input on the output if the vehicle is not in motion and displaying the limited functionality version of the screen associated with the information received from the input on the output if the vehicle is in motion.

4. The method in accordance with claim 3, wherein determining whether said vehicle is in motion is conducted by a sensor at a regular interval.

5. The method in accordance with claim 3, wherein determining whether said vehicle is in motion is conducted continually.

6. The method in accordance with claim 1, wherein the limited functionality version of the screen comprises a menu structure adapted to indicate that lower selections in the structure not having a limited functionality version of the screen corresponding to the selection are disabled.

7. The method in accordance with claim 1, wherein the limited functionality version of the screen includes a summary of the information contained in the full functionality version of the screen.

8. The method in accordance with claim 7, wherein the summary includes at least a portion of a title associated with the information contained in the full functionality version of the screen.

9. The method in accordance with claim 1, further comprising determining whether said vehicle is in motion, and generating audio through a text to speech engine occurs automatically when said vehicle is in motion.

10. A method of providing information to an occupant of a vehicle, comprising:

providing a vehicle computer system including a processor, an input, an output, a text to speech engine, one or more applications adapted to provide screens for display on the output, at least one of the screens having a full functionality version and a limited functionality version, an operating system adapted to provide a common screen, to execute the application, and to selectively allow the display of the full functionality and limited functionality versions of the screen on the output;

receiving information from the input;

determining whether said vehicle is in motion;

preventing the display of the full functionality version of the screen associated with the information received from the input on the output if the vehicle is in motion;

displaying the limited functionality version of the screen associated with the information received from the input on the output if the vehicle is in motion;

displaying the common screen on the output if there is no limited functionality version of the screen associated with the information received from the input; and automatically generating audio through the text to speech engine based on information associated with the screen currently displayed on the output when the vehicle is in motion.

11. A vehicle computer system for providing information to a vehicle occupant, comprising:

a processor;

an input for activating the processor to perform certain functions, the input being operably connected to the processor;

a display for communicating information to the vehicle occupant based on the input to the processor;

a text to speech engine adapted to generate audio corresponding to the information on the display; and at least one software application cooperating with the processor and the output to provide at least one display screen for displaying the information on the display, wherein at least one of the at least one screen having a full functionality version and at least one other of the at least one screen having a limited functionality version.

12. The vehicle computer system in accordance with claim 11, further comprising an operating system adapted to execute the at least one software application and selectively display the full functionality and limited functionality versions of the screen on the display.

13. The vehicle computer system in accordance with claim 12, further comprising at least one sensor for detecting a vehicle motion and to provide information regarding the vehicle motion to the operating system.

14. The vehicle computer system in accordance with claim 13, wherein the operating system is adapted to selectively display the full functionality and limited functionality versions of the screen in response to the information regarding the vehicle motion.

15. The vehicle computer system in accordance with claim 14, wherein the operating system is adapted to display the full functionality version of the screen only if the information indicates that there is vehicle motion.

16. The vehicle computer system in accordance with claim 12, wherein the operating system is adapted to allow the generation of audio by the text to speech engine in response to the information regarding the vehicle motion.

17. The vehicle computer system in accordance with claim 16, wherein the sensor is adapted to continually determine whether said vehicle is in motion and wherein the operating system is adapted to automatically allow the generation of audio by the text to speech engine upon detection of motion of said vehicle by the sensor.

18. The vehicle computer system in accordance with claim 17, wherein the operating system is further adapted to prevent the display of the full functionality version of the screen if the information indicates that there is no vehicle motion.

19. The vehicle computer system in accordance with claim 18, wherein the operating system is further adapted to allow the display of the limited functionality version of the screen if the information indicates that there is vehicle motion.

20. The vehicle computer system in accordance with claim 11, wherein the limited functionality version of the screen comprises a menu structure adapted to indicate that a lower selection in the structure not having a limited functionality version of the screen corresponding to the selection are disabled.

21. The vehicle computer system in accordance with claim 11, wherein the limited functionality version of the screen includes a summary of the information contained in the full functionality version of the screen.

22. The vehicle computer system in accordance with claim 21, wherein the summary includes at least a portion of a title associated with the information contained in the full functionality version of the screen.

* * * * *

UNITED STATES PATENT AND TRADEMARK OFFICE
CERTIFICATE OF CORRECTION

PATENT NO.    : 6,574,531 B2                                           Page 1 of 1
DATED         : June 3, 2003
INVENTOR(S)   : Adrian Ken-min Tan et al.

It is certified that error appears in the above-identified patent and that said Letters Patent is hereby corrected as shown below:

<u>Title page,</u>
Item [75], Inventors, after "Farmington" and before "," insert -- Hills --.

Signed and Sealed this

Twenty-fifth Day of November, 2003

JAMES E. ROGAN
*Director of the United States Patent and Trademark Office*